United States Patent
Marsilio et al.

(10) Patent No.: US 6,938,758 B2
(45) Date of Patent: Sep. 6, 2005

(54) STORAGE CONTAINER FOR RECORDED MEDIA

(75) Inventors: Ronald M. Marsilio, Canton, OH (US); James M. Byrne, Massillon, OH (US)

(73) Assignee: Nexpak Corporation, Uniontown, OH (US)

( * ) Notice: Subject to any disclaimer, the term of this patent is extended or adjusted under 35 U.S.C. 154(b) by 226 days.

(21) Appl. No.: 10/191,088

(22) Filed: Jul. 8, 2002

(65) Prior Publication Data

US 2002/0170838 A1 Nov. 21, 2002

Related U.S. Application Data

(62) Division of application No. 10/081,332, filed on Feb. 20, 2002, now Pat. No. 6,799,677
(60) Provisional application No. 60/270,041, filed on Feb. 20, 2001.

(51) Int. Cl.[7] ............................................... B65D 85/57
(52) U.S. Cl. ................................. 206/308.1; 206/310
(58) Field of Search ............................. 206/308.1, 309, 206/310–312, 493, 472, 232

(56) References Cited

U.S. PATENT DOCUMENTS

| | | | |
|---|---|---|---|
| 4,535,888 A | | 8/1985 | Nusselder |
| 4,744,689 A | * | 5/1988 | Sternberg ................... 402/73 |
| 4,778,047 A | | 10/1988 | Lay |
| 5,168,991 A | * | 12/1992 | Whitehead et al. ......... 206/310 |
| 5,209,593 A | * | 5/1993 | Ros ............................. 402/77 |
| 5,244,085 A | | 9/1993 | Lammerant et al. |
| 5,284,248 A | | 2/1994 | Dunker |
| 5,477,960 A | * | 12/1995 | Chen ........................ 206/308.1 |
| 5,590,770 A | * | 1/1997 | Yeh .......................... 206/308.1 |
| 5,593,031 A | * | 1/1997 | Uchida ..................... 206/308.1 |
| 5,597,068 A | * | 1/1997 | Weisburn et al. ........ 206/308.1 |
| 5,613,612 A | * | 3/1997 | Davault ...................... 206/768 |
| 5,662,216 A | * | 9/1997 | Nesbitt et al. ........... 206/308.1 |
| 5,682,991 A | | 11/1997 | Lammerant et al. |
| 5,695,054 A | | 12/1997 | Weisburn et al. |
| 5,697,498 A | * | 12/1997 | Weisburn et al. ........ 206/308.1 |
| 5,720,384 A | * | 2/1998 | Wu-Chen ................. 206/308.1 |
| 5,727,681 A | | 3/1998 | Li |
| 5,749,464 A | | 5/1998 | Cheris et al. |
| 5,839,576 A | | 11/1998 | Kim |
| 5,845,771 A | * | 12/1998 | Fu ........................... 206/308.1 |
| 5,915,550 A | * | 6/1999 | Gartz ....................... 206/308.1 |
| 5,924,564 A | * | 7/1999 | Lin ......................... 206/308.1 |
| 5,996,785 A | | 12/1999 | Palmer et al. |
| 6,024,215 A | | 2/2000 | Leung |
| 6,050,404 A | * | 4/2000 | Lee ......................... 206/308.1 |
| 6,554,132 B2 | * | 4/2003 | Lau ............................. 206/303 |

* cited by examiner

*Primary Examiner*—Shian T. Luong
(74) *Attorney, Agent, or Firm*—Zollinger & Burleson Ltd (57) ABSTRACT

A retaining device for a disc-shaped item of recorded media includes at least one arm that projects through the central opening of the disc with a locking finger that engages the upper edge of the disc. The disc is released when the user pushes downwardly on the retaining device to collapse the arm through the central opening of the disc to release the disc. The downward force on the device forces portions of the retaining device below the bottom wall of the container. When the downward force is released, the arms engage the lower inner edge of the disc and hold the disc on top of the retaining device. The invention also provides a disc-holding page that snaps into the lid of the container to allow a second disc to be stored.

23 Claims, 7 Drawing Sheets

STORAGE CONTAINER FOR RECORDED MEDIA

CROSS-REFERENCE TO RELATED APPLICATIONS

This application is a divisional application claiming priority from U.S. patent application Ser. No. 10/081,332 filed Feb. 20, 2002, now U.S. Pat. No. 6,799,677 which claimed priority from Provisional Patent Application Ser. No. 60/270,041 filed Feb. 20, 2001; the disclosures of which are incorporated herein by reference.

BACKGROUND OF THE INVENTION

1. Technical Field

This invention relates generally to storage containers for recorded media and, more particularly, to a storage container having a retaining device that selectively retains one or more disc-shaped items of recorded media. The retaining device of the present invention securely holds the item of recorded media while allowing it to be released when the user presses down on the retaining device.

2. Background Information

CDs and DVDs are currently the preferred medium for storing media for distribution to consumers. Numerous storage containers have been developed to hold the discs during shipping, display for sale, and subsequent home storage. Most of these storage containers utilize some type of center hub having fingers that pass through the central opening of the disc to retain the disc. Most existing storage container are designed to hold only a single disc. Other storage containers are designed to hold multiple discs. The art desires a storage container that can be selectively configured to hold one or more discs.

As DVDs have increased in popularity, different types of push button hubs have been developed that release the DVD when the hub is depressed and released. One of the more popular push button hubs is disclosed in U.S. Pat. No. 5,788,068. As shown in FIG. 11 of this patent, the disclosed hub functions by depressing or flexing the center of the disc downwardly until the disc pops off of the locking fingers. Although the removal action functions well, the removal action also undesirably stresses the disc when the center of the disc is being flexed downwardly. The art desires a push button hub that does not flex the disc while it is being removed.

Other push button hubs include levered arms that pivot upwardly to push the center of the disc upwardly when a portion of the hub is depressed. While these types of hubs are effective when properly designed and manufactured, the levered arms lose their resiliency over time. The living hinges can also lose their working range after many uses. An example of this type of device is shown in German reference DE 3425579. The device disclosed in this patent retains the disc with a central hub having a lip. A plurality of spring members are disposed about the central hub and are configured to resiliently engage the bottom surface of the disc when the disc is stored on the hub. The disc is thus trapped between the spring members and the lip during storage. The disc is released by depressing the center button which collapses into the central hole of the disc. Once the lip of the hub is moved inwardly, the spring members push the disc up to a position where it may be removed from the storage container. Other embodiments disclosed in the German publication utilize lever arms that lift the disc off of the retaining hub when the center button is depressed.

SUMMARY OF THE INVENTION

The invention provides a retaining device for a disc-shaped item of recorded media. The retaining device includes at least one arm that projects through the central opening of the disc. The arm includes a locking finger that engages the upper inner edge of the disc to hold the disc on the retaining device. The disc is released when the user pushes downwardly on the retaining device. When the device is pushed down, the arm is collapsed through the central opening of the disc to release the disc.

The downward force on the device forces portions of the retaining device below the bottom wall of the container. These members lift the other members of the container upwardly to lift the disc when the container is used on a surface. When the downward force is released, the arms engage the lower inner edge of the disc and hold the disc on top of the retaining device.

In one embodiment, the invention provides a retaining device having a bridge with an arm and a push button connected to the bridge. The arm is spaced from the push button. The arm is adapted to engage an item of recorded media when resting and disengage the item of recorded media when the push button is depressed.

Another aspect of the present invention is the ability of the storage container to be selectively configured to hold multiple discs. The invention provides a disc-holding page that snaps into the lid of the container to allow a second disc to be stored opposite the disc carried by the base of the container.

BRIEF DESCRIPTION OF THE DRAWINGS

Similar numbers refer to similar parts throughout the specification.

DESCRIPTION OF THE PREFERRED EMBODIMENT

An embodiment of the storage container for an item of recorded media made in accordance with the concepts of the present invention is depicted in the accompanying drawings and is indicated generally by the numeral 10. Storage container 10 includes a base 12 that is hingedly attached to a lid 14. In the embodiment of the present invention depicted in the drawings, the hinged connection between base 12 and lid 14 is formed by a back wall 16 and a pair of continuous living hinges 18. Base 12 includes a sidewall 20 that extends about the three sides (two sides and the front) of base 12 not attached to living hinge 18. Lid 14 includes a corresponding sidewall 22 that engages sidewall 20 when lid 14 is closed. Sidewalls 20 and 22 may abut each other to form a medial line of separation between lid 14 and base 12. In other embodiments, sidewalls 20 and 22 may overlap to form a double thickness sidewall. Lid 14 also includes literature clips 26 that are configured to hold literature books in lid 14. Container 10 may be fabricated from any of a wide variety of materials but it is preferred that it be fabricated from a plastic strong enough to resist breaking when dropped during a drop test.

Figure 2:
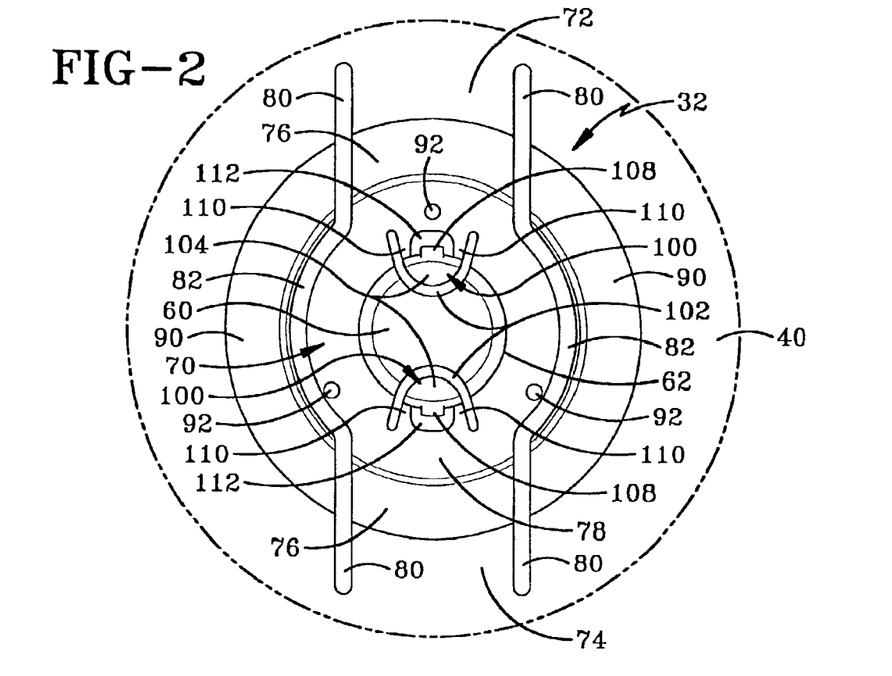
FIG. 2 is a top plan view of the retaining device.
Figure 3:
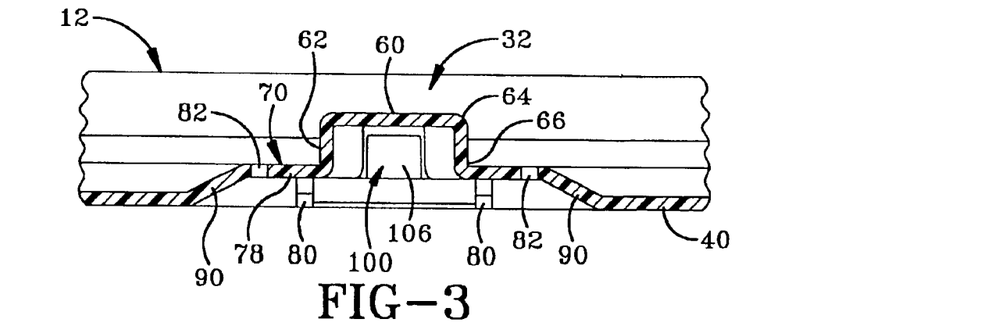
FIG. 3 is a sectional view taken along line 3—3 of FIG. 1.
Figure 4:
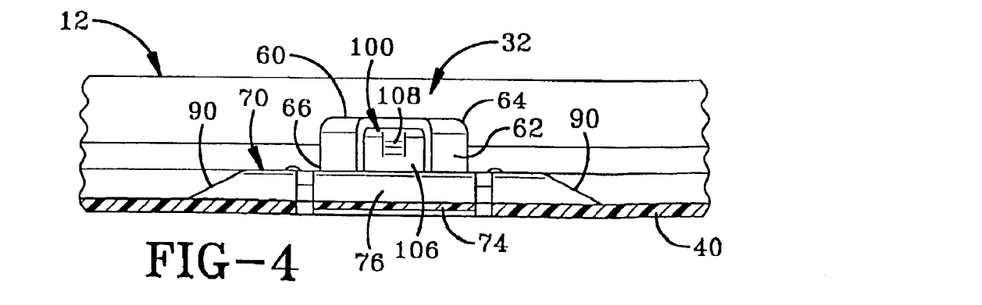
FIG. 4 is a sectional view taken along line 4—4 of FIG. 1.
Figure 5:
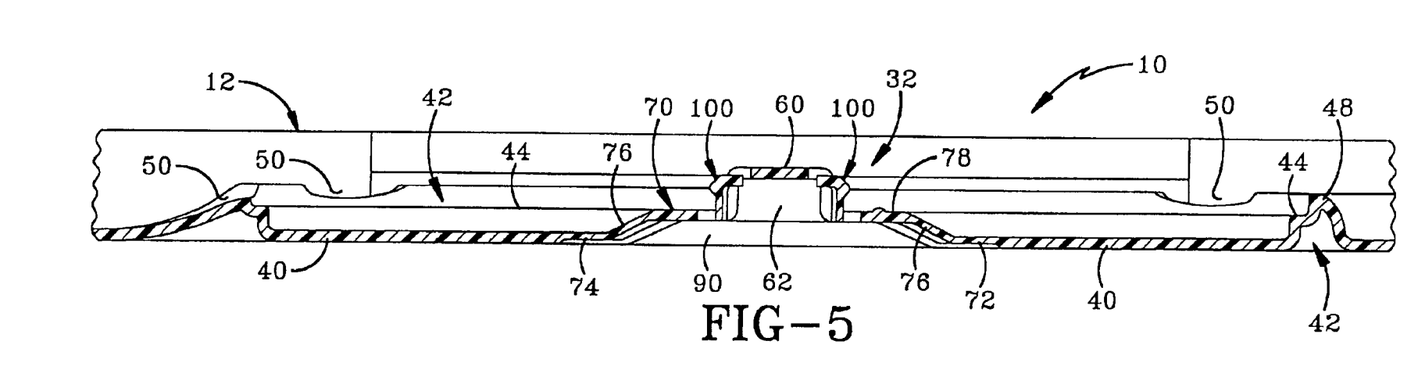
FIG. 5 is a sectional view taken along line 5—5 of FIG. 1.

An item of recorded media 30 may be securely retained in storage container 10 through the engagement of a retaining device or hub 32 with item 30. Item 30 may be a CD or a DVD but it is to be understood that retaining device 32 may be used to store other items 30 having openings 34 (FIG. 8) that are used to retain the item. As will be described in detail below, retaining hub 32 securely retains media 30 in storage container 10 without creating bending forces in media 30 during loading of media 30 onto retaining hub 32, during storage of media 30 in container 10 as depicted in FIG. 2, or during removal of media 30 from storage case 10.

Figure 1:
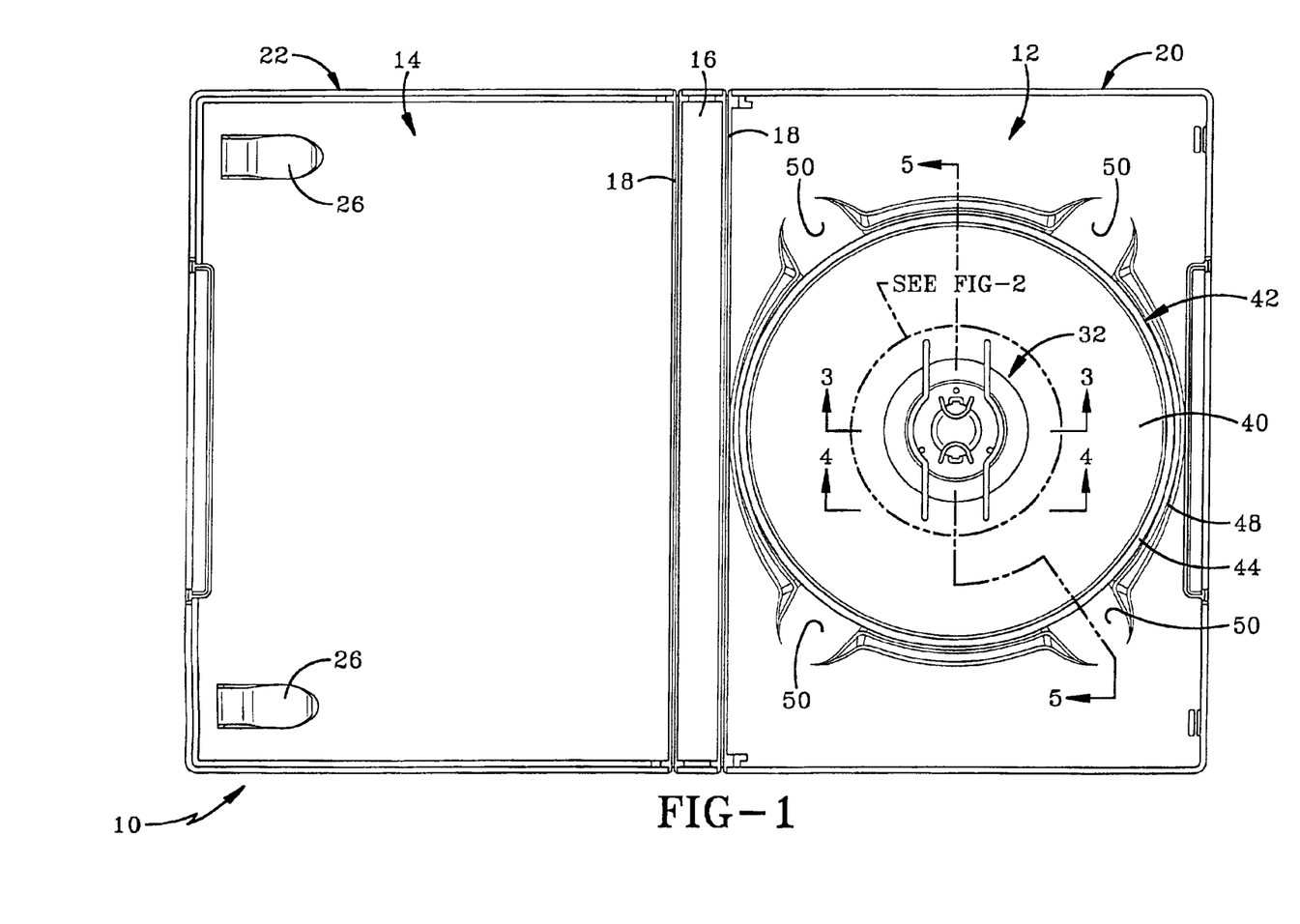
FIG. 1 is a top plan view of the storage container for recorded media including a retaining device.

Base 12 includes a substantially planar bottom wall 40 that extends between retaining hub 32 and an outer wall 42 that substantially surrounds retaining device 32. Outer wall 42 extends upwardly from base wall 40 an defines an upper surface 44 disposed below the outer edge of item 30. As may be perhaps best seen in FIG. 1, annular outer wall 42 may extend entirely about the area where item 30 is received and is substantially circular in shape.

Figure 6:
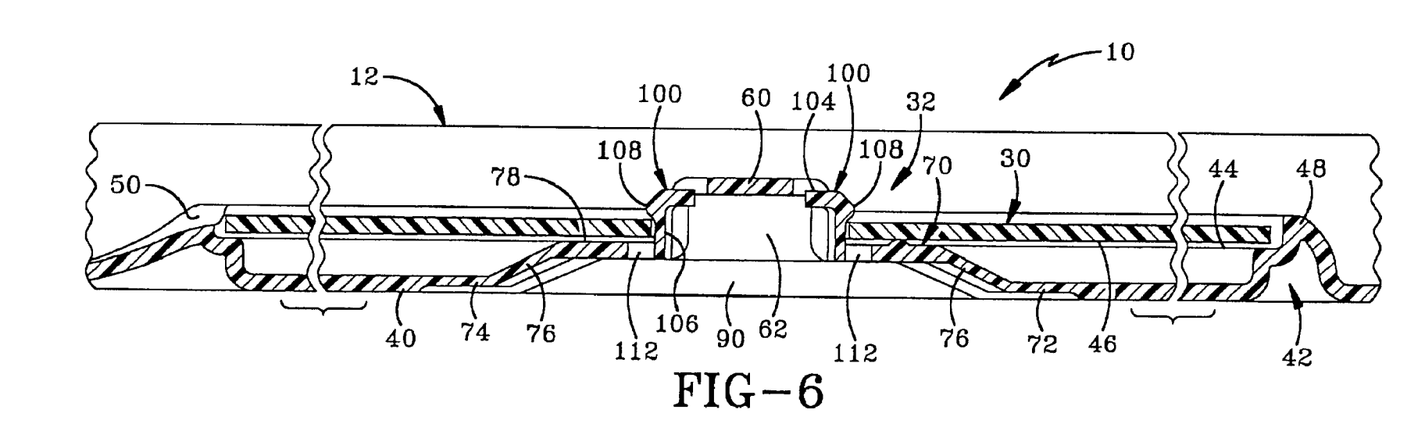
FIG. 6 is a view similar to FIG. 5, with portions broken away, showing a disc retained on the retaining device.
Figure 7:
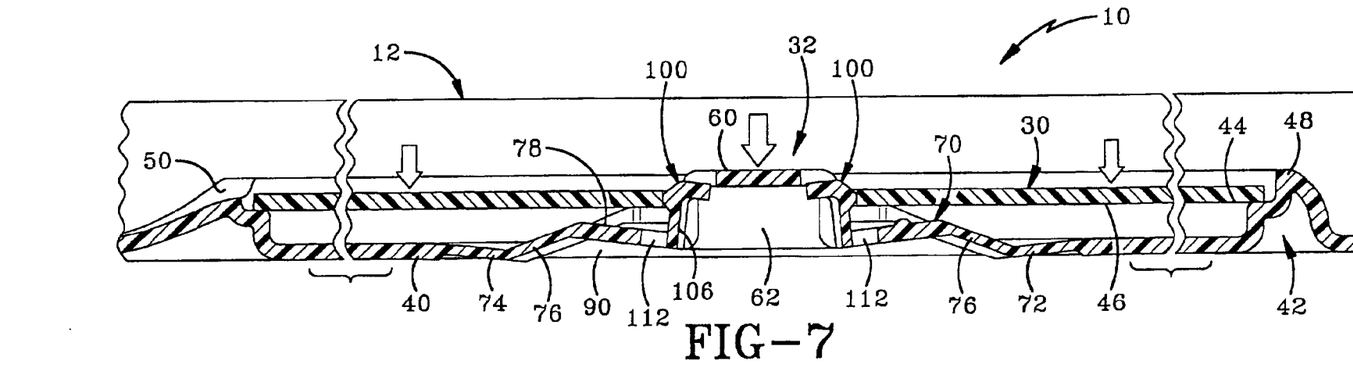
FIG. 7 is a view similar to FIG. 6 showing a downward force being applied to the retaining device.

Annular outer wall 42 has an upper surface 44 on which the lower surface 46 of item 30 engages when item 30 is being removed from retaining device 32 as depicted in FIG. 7. In the storage position depicted in FIG. 6, bottom surface 46 is disposed above surface 44. In other embodiments of the invention, surface 44 supports surface 46 when disc 30 is in the storage position. Annular outer wall 42 is sized and configured such that the contact between upper surface 44 and lower surface 46 does not extend into the area of item 30 that includes recorded information. Annular outer wall 42 thus prevents the outer portion of item 30 from being moved lower than upper surface 44.

A blocking wall 48 extends upwardly from upper surface 44 of outer wall 42 radially outside the outer radial dimension of disc 30. Blocking wall 48 is thus positioned such that it does not contact disc 30 when disc 30 is retained by device 32. Blocking wall 48 has a height substantially equal to or greater than the thickness of disc 30 such that a person cannot easily, if at all, grasp the edge of disc 30 when disc 30 is in the storage position depicted in FIG. 6. There are, however, finger access openings 50 formed in wall 42 where the height of blocking wall 48 is somewhat less than the thickness of disc 30. Finger access openings 50 are not intended to allow a person to grasp the edge of disc 30 when disc 30 is in the storage position. Finger access openings 50 allow a person to easily grasp the edge of disc 30 when disc 30 is in the released position depicted in FIG. 10. As such, blocking wall 48 prevents a person from grasping an edge of disc 30 and pulling upwardly. Such a practice is common when removing a compact disc from a compact disc storage container. If performed on a DVD held in storage container 10, retaining hub 32 would maintain its engagement with the DVD and the upward force at its edge would likely break or otherwise damage the DVD by creating a large bending force. It may thus be understood that annular outer wall 42 and blocking wall 48 prevent the removal of disc 30 without first removing disc 30 from retaining device 32.

As noted above, storage container 10 includes retaining device 32 that extends upwardly from base wall 40. Retaining device 32 is configured to retain disc 30 until device 32 is subjected to a downward force which is subsequently released. The downward force causes device 32 to collapse inwardly and downwardly to completely release disc 30. The downward force also causes portions of retaining device 32 to drop below the lower surface of bottom wall 30 causing outer wall 42 to move upwardly to lift disc 30 when bottom wall 40 is disposed on a flat surface. When the force is removed, hub 32 contacts disc 30 and lifts it into the position depicted in FIG. 10 where it may be removed. Retaining hub 32 is also configured to retain disc 30 in a manner such that it may freely rotate on hub 32 in the storage position depicted in FIG. 6.

Retaining hub 32 includes a center button 60 that includes a downwardly extending sidewall 62 that has an upper end 64 and a lower end 66. Center button 60 may have rounded edges to provide comfort to those using storage container 10. Sidewall 62 projects up from a bridge 70 that extends up from opposed portions of bottom wall 40 at first 72 and second 74 ends. Bridge 70 thus includes ends 72 and 74, a pair of upwardly projecting walls 76, and an upper wall 78. Each end 72 and 74 is a portion of bottom wall 40 that has been sectioned off by slots 80 such that the edges of ends 72 and 74 are spaced from bottom wall 40 by slots 80. Each end 72 and 74 has a thickness that may be less than the thickness of bottom wall 40. Each projecting wall 76 may also have a reduced thickness compared to wall 78 and bottom wall 40.

Slots 80 may be substantially parallel across device 32 or may include curved sections 82 at upper wall 78.

Device 32 includes fixed supports 90 disposed radially outwardly of slots 80. Fixed supports 90 have an upper surface disposed at the same level as the upper surface of upper wall 78. Fixed supports 90 prevent the center of disc 30 from being depressed when bridge 70 is pushed downwardly.

Upper wall 78 may include raised bumps 92 that minimize friction between surface 46 of disc 30 and device 32. When bumps 92 are used, the lower surface 46 of disc 30 is raised above surface 44 and fixed supports 90 when disc 30 is in the resting or storage position depicted in FIG. 6.

Device 32 further includes a pair of arms 100 that are each cantilevered from upper wall 78 of bridge 70. Arms 100 are disposed on opposite sides of button 60 and are spaced from button 60 (and sidewall 62) so that arms 100 may move independent of button 60. Arms 100 are configured to move inwardly (toward each other) relative to button 60 when bridge 70 is pushed down. Arms 100 may be disposed in an opening 102 defined by button 60 and wall 62. Each opening 102 may be curved to define a curved opening to receive arm 100.

Figure 8:
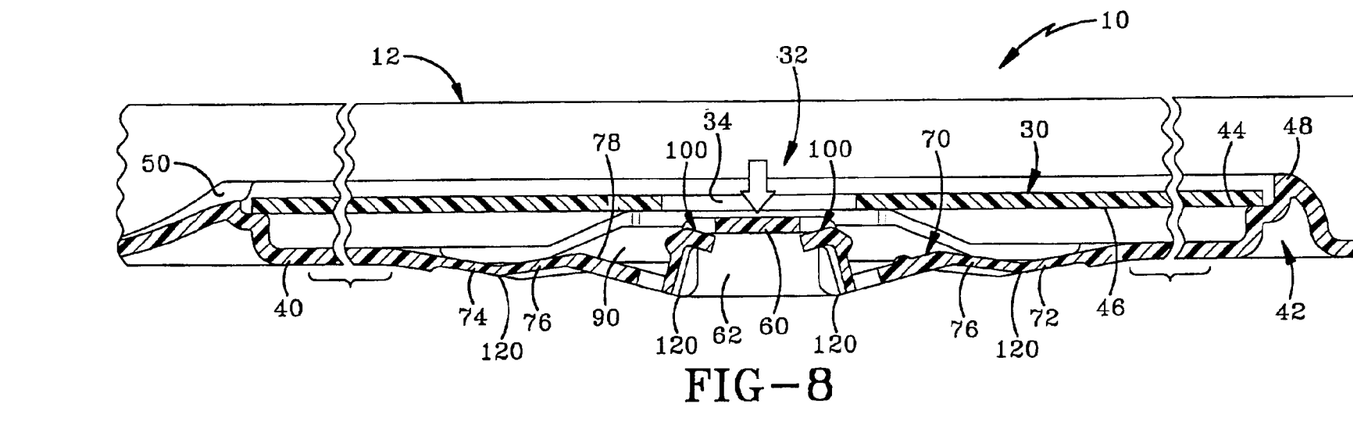
FIG. 8 is a view similar to FIG. 6 showing the retaining arms of the retaining device being collapsed through the central hole of the disc.

The upper wall 104 of each arm 100 is disposed lower than button 60 so that upper wall 104 may slide under button 60 as shown in FIG. 8. The sidewall 106 of arm 100 includes a locking finger 108 that latches over the top edge of disc 30 to retain disc 30 on retaining device 32. Each sidewall 106 of arm 100 is cantilevered from upper wall 78 by a pair of lever arms 110 disposed on either side of an opening 112. Openings 102 extend as slots into upper wall 78 on the other side of each lever arm 110 from opening 112.

When a person wants to remove disc 30 from storage container 10, the person creates a downward force on center button 60 causing hinged arms 100 to collapse inwardly and downwardly causing fingers 108 to disengage the upper inner edge of disc 30. FIG. 6 shows the storage position. When the force initially acts on button 60, the entire disc 30 moves downwardly with bridge 70 until disc 30 engages wall 44 and fixed supports 90. In other embodiments of the invention, disc 30 does not have to move down because it is resting on wall 44 in the storage position.

As button 60 is pushed farther down, arms 100 collapse inwardly as shown in FIG. 7. Button 60 may be pushed all the way down so that the upper surface of button 60 is disposed below fixed supports 90. In this position, disc 30 is released by device 32 and is free to be removed.

Figure 9:
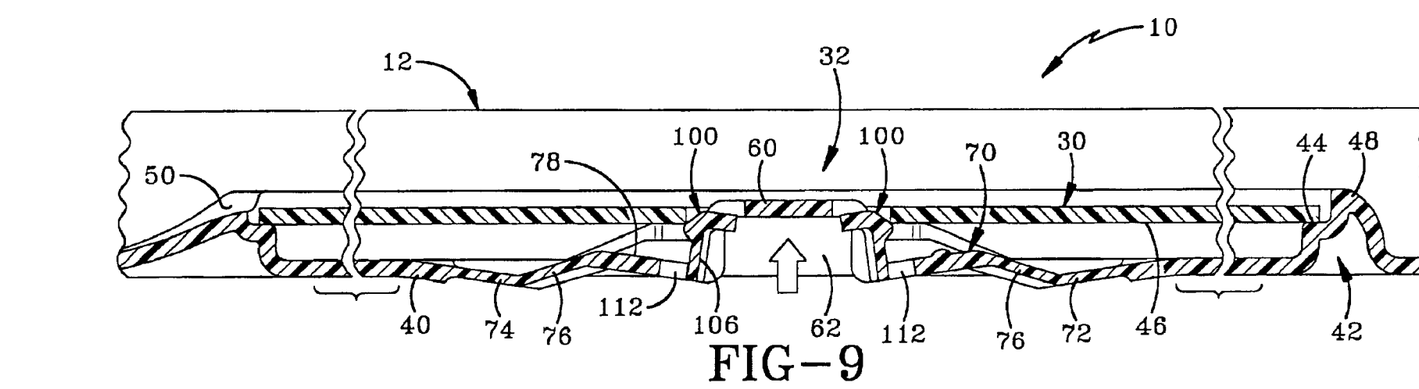
FIG. 9 is a view similar to FIG. 6 showing the retaining device returning to its resting position.
Figure 10:
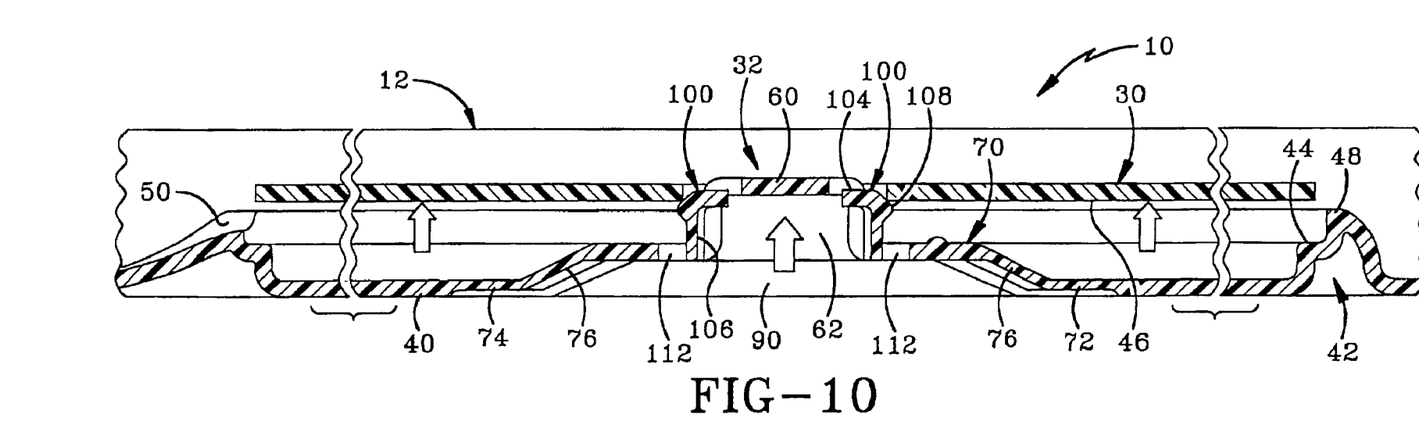
FIG. 10 is a view similar to FIG. 6 showing the disc in a released position on the retaining device.
Figure 11:
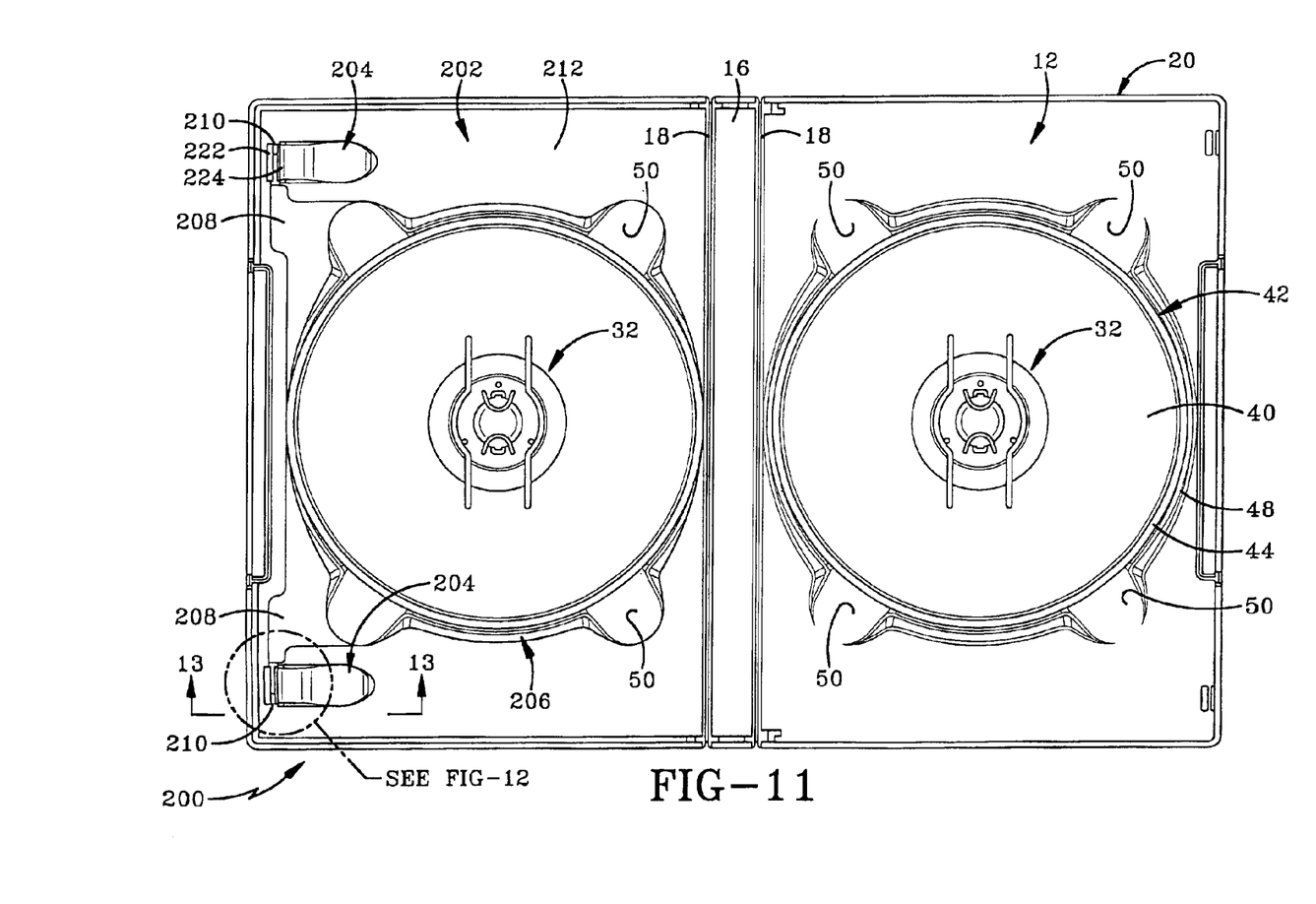
FIG. 11 is a view similar to FIG. 1 showing the storage container configured to hold a second disc.
Figure 12:
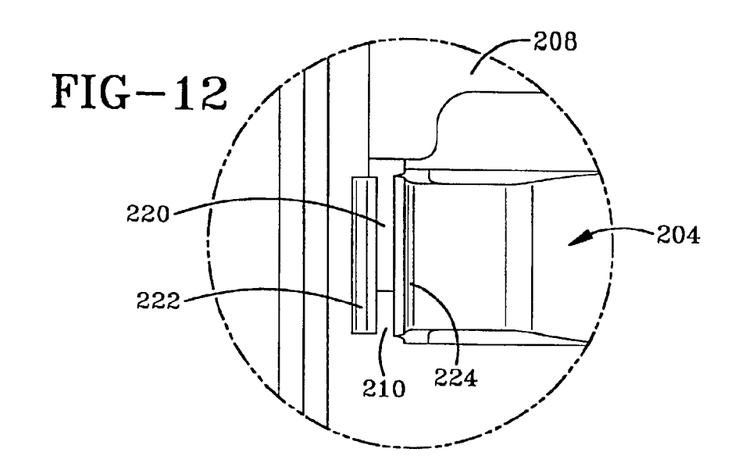
FIG. 12 is an enlarged view of the encircled portion of FIG. 11.
Figure 13:
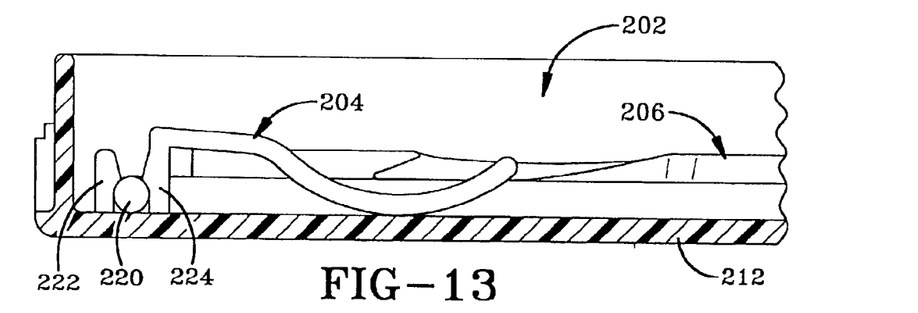
FIG. 13 is a sectional view taken along line 13—13 of FIG. 11.

When base 12 is disposed on a surface when button 60 is pushed down, the lower corners 120 of bridge 70 (FIG. 8) engage the surface and at least one portion of base 12 such as a portion of wall 42 moves upwardly to raise disc 30. When bridge 70 is released, fingers 108 engage disc 30 to hold it in a position where it can be removed as depicted in FIGS. 9 and 10.

Almost no bending forces are experienced by disc 30 during removal of disc 30 from storage container 10. Bending forces are prevented because disc 30 is supported during the collapse of bridge 70 and because arms 100 collapse inwardly without engaging disc 30.

The second embodiment of the storage container of the present invention is indicated generally by the numeral 200 in FIGS. 11-14. Storage container 200 includes base 12 as described above and a lid 202 that is connected to base 12 with hinges 18 as described above. Lid 202 differs from lid 14 in that lid 202 is configured to selectively receive a disc-holding page 206 that allows container 200 to be selectively configured to hold a second item of recorded media. In the exemplary embodiment of the invention, the literature clips 204 of lid 202 are configured to selectively receive a disc-holding page 206. In other embodiments of the invention, the clips that hold page 206 may be spaced from clips 204 and may be positioned along the front wall, the hinge wall, or either sidewall of lid 202.

Disc-holding page 206 includes a retaining device 32 similar to that described above with respect to the first embodiment of the invention. Page 206 may also include any of a variety of other hubs known in the art. In some embodiments, the overall height of retaining device 32 may have to be lowered so that the hub 32 carried by page 206 does not interfere with device 32 carried by base 12.

Page 206 includes at least one leg 208 that is engaged by a literature clip 204 to retain page 206 on lid 202. Leg 208 may be disposed in a slot 210 formed by portions of literature clip 204 as depicted in the drawings. Leg 208 may also be retained under literature clip 204 between the bottom wall 212 of lid 202 and a portion of literature clip 204. Leg 208 may also be disposed in an opening defined by literature clip 204.

Figure 14:
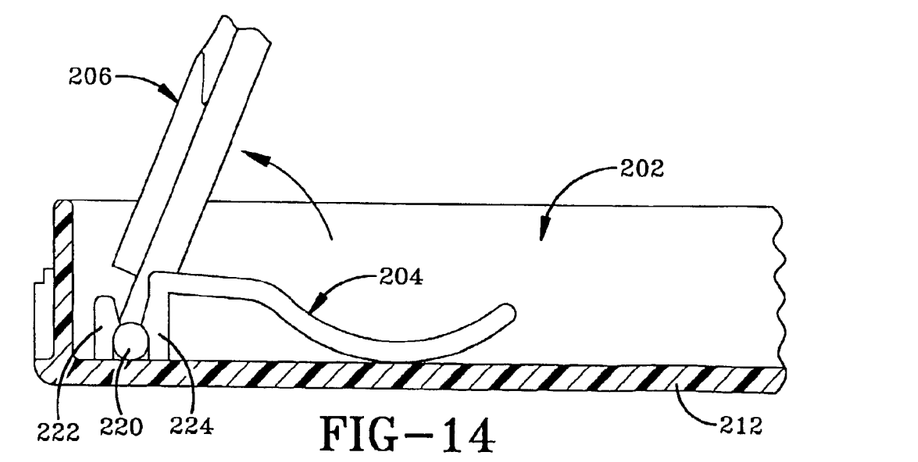
FIG. 14 is a view similar to FIG. 13 showing the disc retaining page pivoted to an upright position.

In the embodiment of the invention depicted in the drawings, leg 208 includes a pin 220 that is snap-fit into a recess 210 defined between first 222 and second 224 walls of literature clip 204. This configuration allows pins 220 to be snapped down into clips 204 from above in a tight snap-fit connection that prevents page 206 from readily falling out of lid 202. This configuration also allows page 206 to pivot upwardly with respect to bottom wall 212 as depicted in FIG. 14.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. A storage container for holding first and second items of recorded media; the storage container comprising:
   a base;
   a first retaining device connected to the base; the first retaining device adapted to hold the first item of recorded media;
   a lid hingedly connected to the base;
   the lid being movable between open and closed positions;
   a pair of literature clips connected to the lid;
   a page connected to the literature clips;
   a second retaining device connected to the page; the second retaining device adapted to hold the second item of recorded media adjacent the page; and
   the page including legs that engage the literature clips to connect the page with the literature clips.

2. The storage container of claim 1, wherein each of the literature clips defines a slot; each leg being disposed in one of the slots.

3. The storage container of claim 2, wherein the legs are snap fit into the slots.

4. The storage container of claim 3, wherein each of the legs includes a pin that engages the literature clip.

5. A storage container for holding first and second items of recorded media; the storage container comprising:
   a base;
   a first retaining device connected to the base; the first retaining device adapted to hold the first item of recorded media;
   a lid hingedly connected to the base;
   the lid being movable between open and closed positions;
   a pair of literature clips connected to the lid;
   a page connected to the literature clips;
   a second retaining device connected to the page; the second retaining device adapted to hold the second item of recorded media adjacent the page; and
   the first retaining device having a first height; the second retaining device having a second height; the first height being larger than the second height.

6. The storage container of claim 5, wherein each of the retaining devices is adapted to hold a disc-shaped item of recorded media.

7. The storage container of claim 6, wherein each retaining device is a push button-type retaining device.

8. The storage container of claim 5, wherein the page is pivotally carried on the lid by the pair of literature clips.

9. A storage container for recorded media; the container comprising:
   a base;
   a lid hingedly connected to the base;
   a literature clip connected to the lid; the lid having opposed edges with one edge disposed adjacent the hinged connection to the lid; the literature clip being disposed adjacent the edge of the lid opposite the hinged connection to the base;

a page connected to the literature clip; and a retaining device connected to the page; the retaining device adapted to hold an item of recorded media on the page;

the page is pivotally connected to the literature clip; and the lid is connected to the base with a hinge; the lid having opposed edges with one edge disposed adjacent the hinge; the literature clip being disposed adjacent the edge opposite the hinge.

10. The storage container of claim 9, wherein a portion of the page is disposed under the literature clip.

11. The storage container of claim 9, wherein a portion of the page is snap fit into a portion of the literature clip.

12. The storage container of claim 9, wherein the literature clip defines a slot; a portion of the page being disposed in the slot.

13. The storage container of claim 12, wherein the page includes a leg that is snap fit into the slot.

14. A storage container for recorded media; the container comprising:

a base;

a back wall; the base being connected to the back wall with a first living hinge;

a lid connected to the back wall with a second living hinge;

the lid having opposed edges with a first edge connected to the second living hinge and a second edge spaced from the first edge;

a retaining device connected to the base; the retaining device adapted to hold a disc-shaped item of recorded media on the base;

a page connected to the lid adjacent the second edge of the lid; and a second retaining device connected to the page; the second retaining device adapted to hold a disc-shaped item of recorded media on the page;

wherein the page is pivotally connected to the lid, and wherein the first retaining device has a first height; the second retaining device has a second height; and the first height is larger than the second height.

15. The storage container of claim 14, wherein each of the retaining devices is adapted to hold a disc-shaped item of recorded media.

16. The storage container of claim 15, wherein each retaining device is a push button-type retaining device.

17. A storage container for recorded media; the container comprising:

a base;

a back wall; the base being connected to the back wall with a first living hinge;

a lid connected to the back wall with a second living hinge;

the lid having opposed edges with a first edge connected to the second living hinge and a second edge spaced from the first edge;

a retaining device connected to the base; the retaining device adapted to hold a disc-shaped item of recorded media on the base;

a page connected to the lid adjacent the second edge of the lid; and a second retaining device connected to the page; the second retaining device adapted to hold a disc-shaped item of recorded media on the page, and wherein the lid defines a slot; a portion of the page being disposed in the slot.

18. The storage container of claim 17, wherein the page includes a leg that is snap fit into the slot.

19. The storage container of claim 18, wherein the base, back wall, and lid are integrally molded.

20. A storage container for recorded media; the container comprising:

a container body having a base, a back wall, and a lid; the lid being movable between open and closed positions;

the base being connected to the back wall with a first living hinge;

the lid connected to the back wall with a second living hinge;

the lid having opposed edges with a first edge connected to the second living hinge and a second edge spaced from the first edge;

a retaining device connected to the base; the retaining device adapted to hold a disc-shaped item of recorded media on the base;

the body defining a first slot;

a page having a first leg disposed in a snap fit relationship in the first slot defined by the body;

the page being pivotally connected to the body; and a second retaining device connected to the page; the second retaining device adapted to hold a disc-shaped item of recorded media on the page.

21. The storage container of claim 20, wherein the first and second retaining devices overlie each other when the lid is closed.

22. The storage container of claim 20, wherein the body defines a second slot; the page having a second leg disposed in a snap fit relationship in the second slot defined by the body.

23. The storage container of claim 22, wherein each retaining device is a push button-type retaining device.

* * * * *